United States Patent
Chen et al.

(10) Patent No.: US 7,865,548 B2
(45) Date of Patent: Jan. 4, 2011

(54) EMAIL RECOVERY METHOD AND SYSTEM

(75) Inventors: Yen-Fu Chen, Austin, TX (US); John Hans Handy-Bosma, Cedar Park, TX (US); Patsy Annette Spears, Round Rock, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 11/481,726

(22) Filed: Jul. 6, 2006

(65) Prior Publication Data

US 2008/0010350 A1 Jan. 10, 2008

(51) Int. Cl.
G06F 15/16 (2006.01)
(52) U.S. Cl. ...................................... 709/203
(58) Field of Classification Search .................. 709/206
See application file for complete search history.

(56) References Cited

U.S. PATENT DOCUMENTS

| | | | | |
|---|---|---|---|---|
| 5,764,235 | A * | 6/1998 | Hunt et al. | 345/428 |
| 6,611,275 | B1 * | 8/2003 | Zey et al. | 715/752 |
| 6,836,895 | B2 | 12/2004 | Hamlin | |
| 6,892,222 | B2 | 5/2005 | McDowell et al. | |
| 7,412,489 | B2 * | 8/2008 | Nowacki et al. | 709/206 |
| 2004/0098383 | A1 * | 5/2004 | Tabellion et al. | 707/3 |
| 2004/0221048 | A1 * | 11/2004 | Ogier | 709/229 |
| 2004/0254989 | A1 | 12/2004 | Baratakke et al. | |
| 2006/0031357 | A1 * | 2/2006 | Misra et al. | 709/206 |
| 2007/0067399 | A1 * | 3/2007 | Kulkarni et al. | 709/206 |
| 2007/0083930 | A1 * | 4/2007 | Dumont et al. | 726/24 |
| 2007/0192416 | A1 * | 8/2007 | Gupta | 709/206 |

FOREIGN PATENT DOCUMENTS

JP 2000357132 A 12/2000

OTHER PUBLICATIONS

Rabinovich, et al.; DHTTP: An Efficient and Cache-Friendly Transfer Protocol for the Web; IEEE/ACM Transactions on Networking, vol. 12, No. 6; Dec. 2004; pp. 1007-1020.

Segal, et al.; MailCat: An Intelligent assistant for Organizing E-Mail; Autonomous Agents '99 Seattle WA USA; ACM 1999 1-58113-066-x/99/05; pp. 276-282.

Barga, et al.; Recovery Guarantees for Internet Applications; ACM Transactions on Internet Technology, vol. 4, No. 3; Aug. 2004; pp. 289-328; ACM 1533-5399/04/0800-0289.

Blumenthal, et al.; Rethinking the Design of the Internet: The End-to-End Arguments vs. the Brave New World; ACM Transactions on Internet Technology, vol. 1, No. 1; Aug. 2001; pp. 70-109; ACM 1533-5399/01/0800-0070.

* cited by examiner

Primary Examiner—Philip C Lee
Assistant Examiner—Herman Belcher
(74) Attorney, Agent, or Firm—Schmeiser, Olsen & Watts; William E. Schiesser

(57) ABSTRACT

An email recovery system and method. The method comprises receiving by a server system, an email from a sender. The email comprises a message for a recipient. The email is archived with a plurality of emails saved on said server system. A first copy of the email is sent to the recipient. The first copy is now unavailable to the recipient. A request to query the plurality of emails in order to search for the email is received by the server system from the recipient. The server system authenticates the request and the recipient. The server system queries the plurality of emails. The email is located as a result of the querying. The server system sends a second copy of the email to the recipient.

33 Claims, 6 Drawing Sheets

EMAIL RECOVERY METHOD AND SYSTEM

TECHNICAL FIELD

The present invention relates to a method and associated system for recovering an unavailable email.

BACKGROUND OF THE INVENTION

Locating lost data within a computer system typically requires a lengthly time consuming process. Accordingly, there exists a need in the art to overcome the deficiencies and limitations described herein above.

SUMMARY OF THE INVENTION

The present invention provides a method, comprising:
receiving, by a server system, an email from a sender, said email comprising a message for a recipient;
archiving, by said server system, said email with a plurality of emails saved on said server system;
sending, by said server system, a first copy of said email to said recipient;
receiving, by said server system, a request from said recipient to query said plurality of emails in order to search for said email, said first copy not being available to said recipient;
authenticating, by said server system, said request and said recipient;
querying, by said server system, said plurality of emails;
locating, as a result of said querying, said email; and
sending, by said server system, a second copy of said email to said recipient.

The present invention provides a server system comprising a processor coupled to a computer-readable memory unit, said memory unit comprising instructions that when executed by the processor implement an email recovery method, said method comprising;
receiving, by said server system, an email from a sender, said email comprising a message for a recipient;
archiving, by said server system, said email with a plurality of emails saved on said server system;
sending, by said server system, a first copy of said email to said recipient;
receiving, by said server system, a request from said recipient to query said plurality of emails in order to search for said email, said first copy not being available to said recipient;
authenticating, by said server system, said request and said recipient;
querying, by said server system, said plurality of emails;
locating, as a result of said querying, said email; and
sending, by said server system, a second copy of said email to said recipient.

The present invention provides a computer program product, comprising a computer usable medium comprising a computer readable program code embodied therein, said computer readable program code comprising an algorithm adapted to implement an email recovery method within a server system, said method comprising:
receiving, by said server system, an email from a sender, said email comprising a message for a recipient;
archiving, by said server system, said email with a plurality of emails saved on said server system;
sending, by said server system, a first copy of said email to said recipient;
receiving, by said server system, a request from said recipient to query said plurality of emails in order to search for said email, said first copy not being available to said recipient;
authenticating, by said server system, said request and said recipient;
querying, by said server system, said plurality of emails;
locating, as a result of said querying, said email; and
sending, by said server system, a second copy of said email to said recipient.

The present invention provides a process for integrating computing infrastructure, comprising integrating computer-readable code into a server system, wherein the code in combination with the server system is capable of performing an email recovery method comprising:
receiving, by said server system, an email from a sender, said email comprising a message for a recipient;
archiving, by said server system, said email with a plurality of emails saved on said server system;
sending, by said server system, a first copy of said email to said recipient;
receiving, by said server system, a request from said recipient to query said plurality of emails in order to search for said email, said first copy not being available to said recipient;
authenticating, by said server system, said request and said recipient;
querying, by said server system, said plurality of emails;
locating, as a result of said querying, said email; and
sending, by said server system, a second copy of said email to said recipient.

The present invention advantageously provides a simple method and associated system capable of locating lost data in a computing system.

BEST MODE FOR CARRYING OUT THE INVENTION

Figure 1:
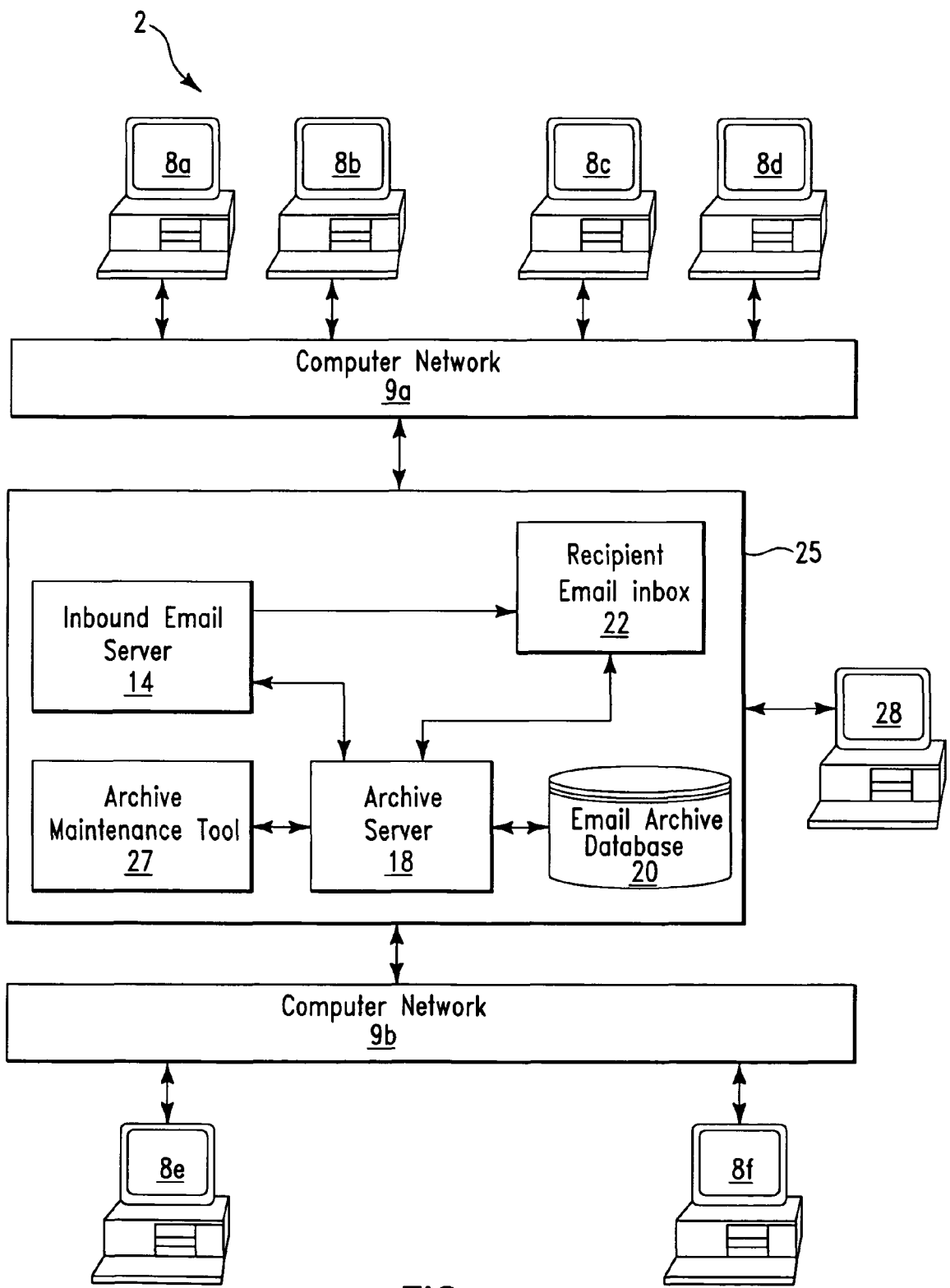
FIG. 1 illustrates a block diagram view of a system for recovering emails that have been made unavailable, in accordance with embodiments of the present invention.

FIG. 1 illustrates a block diagram view of a system 2 for recovering emails that have been made unavailable, in accordance with embodiments of the present invention. System 2 allows email recipients (i.e., through terminals 8a . . . 8d) whom have had an email(s) sent to them and are unable to locate the email(s) to "re-send" the unlocatable emails to themselves without making a request to a sender to re-send the email. The emails may be unlocatable because the recipient may have deleted (accidentally or without anticipation of future need) or may not have even received (e.g., due to a server failure, spam blocking, etc) the email(s).

System 2 comprises email recipient computers or terminals 8a . . . 8d, a computer network 9a and 9b, an administrator terminal 28, and a server system 25. Network 9a and 9b may comprise any type of network known to a person of ordinary skill in the art including, inter alia, a wireless network, a local area network, a wide area network, the Internet, etc. Server system 25 comprises an inbound email server 14, an archive email sever 18, an email archive database 20, an archive maintenance tool 27, and a recipient (or recipients) email inbox 22. Recipient (or recipients) email inbox 22 may comprise any server based email inbox such as, inter alia, web mail, IMAP protocol, etc. Alternatively, recipient (or recipients) email inbox 22 may be located on any of terminals 8a . . . 8d such as, inter alia, POP3 protocol, etc. System 2 enables a sender to use any of terminals 8e or 8f to send an email or emails to email recipients through terminals 8a . . . 8d. The following discussion describes an overall process for using system 2 to send and re-send emails to email recipients.

An email sent from one of terminals 8e or 8f and over network 9b is routed to inbound email server 14. Inbound email server 14 sends a first copy of the email to recipient email inbox 22 so that the recipient may retrieve the first copy. The email is sent to archive server 18 for archiving and the email is stored in email archive database 20. Filters may be applied based on file size, entitlement, email characteristics, etc. in order to reduce network traffic and disk usage. If the email recipient (i.e., for the email) is unable to locate the first copy of the email (e.g., the email recipient may have deleted (accidentally or without anticipation of future need), the email recipient may not have received (e.g., due to a server or client failure, spam blocking, etc) the first copy of the email), a request may be made by the email recipient to the archive server 18 to re-send the email (i.e., a second copy of the email). The email recipient may need to determine if server system 25 supports an enhanced email re-send process. For example, a determination may be made as an automatic and silent process when the email recipient creates/modifies an email account, when a re-send dialog box opens before the email recipient enters data, etc. The email recipient may initiate a connection with server system 25, such as in the POP3 protocol. During an email transaction state (i.e., to determine if server system 25 supports an enhanced email re-send process), server system 25 (e.g., archive server 18) sends a 3-4 character keyword with an argument such as "resendFunc:Test". The argument could be in STAT, in which case a response might be +OK 4450 Yes. Alternatively, if server system 25 does not support the functionality, an –ERR may be given. At this point, the email recipient should issue a STAT command without an argument to verify that it is indeed the functionality that is unsupported, or generate a "could not connect to server" message and wait until a next connection. A result of the aforementioned test would enable or disable re-send functionality. In order to use server system 25 (e.g., archive server 18) to perform an email re-send process, the email recipient must access a re-send dialog box or another command interface (e.g., see re-send dialog box in FIGS. 4 and 5) to supply a criteria for locating an email to be re-sent. The re-send dialog box provides an interface to sever system 25 (e.g., archive server 18) for email recipient. A re-send dialog box is generated using a software tool located on or presented to terminals 8a . . . 8d using data located in server system 25. The re-send dialog box is accessible to the email recipient using any of terminals 8a . . . 8d. Criteria for locating an email to be re-sent may include, inter alia, a sender's address, a sender's name, a date and time range for the email, a maximum number of records (i.e., emails) to retrieve, attachment status, email subject or email body text, email size, urgency of email, etc. The email recipient also needs to send and receive POP3 or equivalent protocol commands and parse any search responses from server system 25 into the re-send dialog box and re-sent messages into recipient email inbox 22. Search responses should be formatted into a sort able, searchable list so that the email recipient may select any number of emails for a re-send request. The email recipient may be given global options to pre-fix a subject or establish a unique folder for re-sent emails.

The following description describes three processing procedures performed by server system 25. The three processing procedures are a re-send search request procedure, a re-send email request procedure, and an archive management procedure.

Re-Send Search Request Procedure

When the email recipient requests a re-send search (i.e., a search for deleted emails), server system 25 will process the request and attempt to retrieve a list of emails in archive database 20 that meet a search criteria. The archive management software (i.e., on archive server 18) is responsible for the majority of the business logic to keep load on the inbound server to a minimum. Archive server 18 will respond with a list of emails (i.e., per search criteria) and server system 25 (e.g., POP3 server) will provide the list back to the email recipient in the open connection. Similar to a standard email protocol such as IMAP or POP3, the list will use message numbers as an argument.

Re-Send Email Request Procedure

When the email recipient requests an email re-send (i.e., a request to send a second copy of an email), server system 25 will process the request and forward the request to archive server 18 using an email protocol, including a message number. In this case inbound email server 14 (e.g., a POP3 server) is acting as a proxy between the email recipient and archive server 18. Archive server 18 will respond with the requested email (i.e., copy of) and inbound email server 14 will send the email to the email recipient in the open connection. At no time will archive server 18 or inbound email server 14 modify the email's date and time information. This process allows the re-sent email to have an original date and time and be placed in proper context for the email recipient.

Archive Management Procedure

In order to prevent archive database 20 from exceeding hard drive space limits in server system 25, various automated management techniques may be performed. A balance is required that weighs the needs of customers vs. the cost of storage. Thresholds for managing archive database 20 may be determined by server administrators using terminal 28.

Examples of Automated Management Techniques for Managing Archive Database 20

When multiple email recipients share inbound email server 14 (e.g., a POP3 server), inbound email server 14 may associate a single copy of an archived email with all recipients.

Archive server 18 may be virtually clustered to spread the load and maintain a single copy of archived email when email recipients span servers.

Email older than a certain date may be purged.

Email may be deleted when an individual email recipient exceeds a certain size limit.

Thresholds may be set based on individual or group entitlement (more space for higher service tiers).

Email may be scanned or re-scanned with new or improved spam or virus detection routines.

Figure 2:
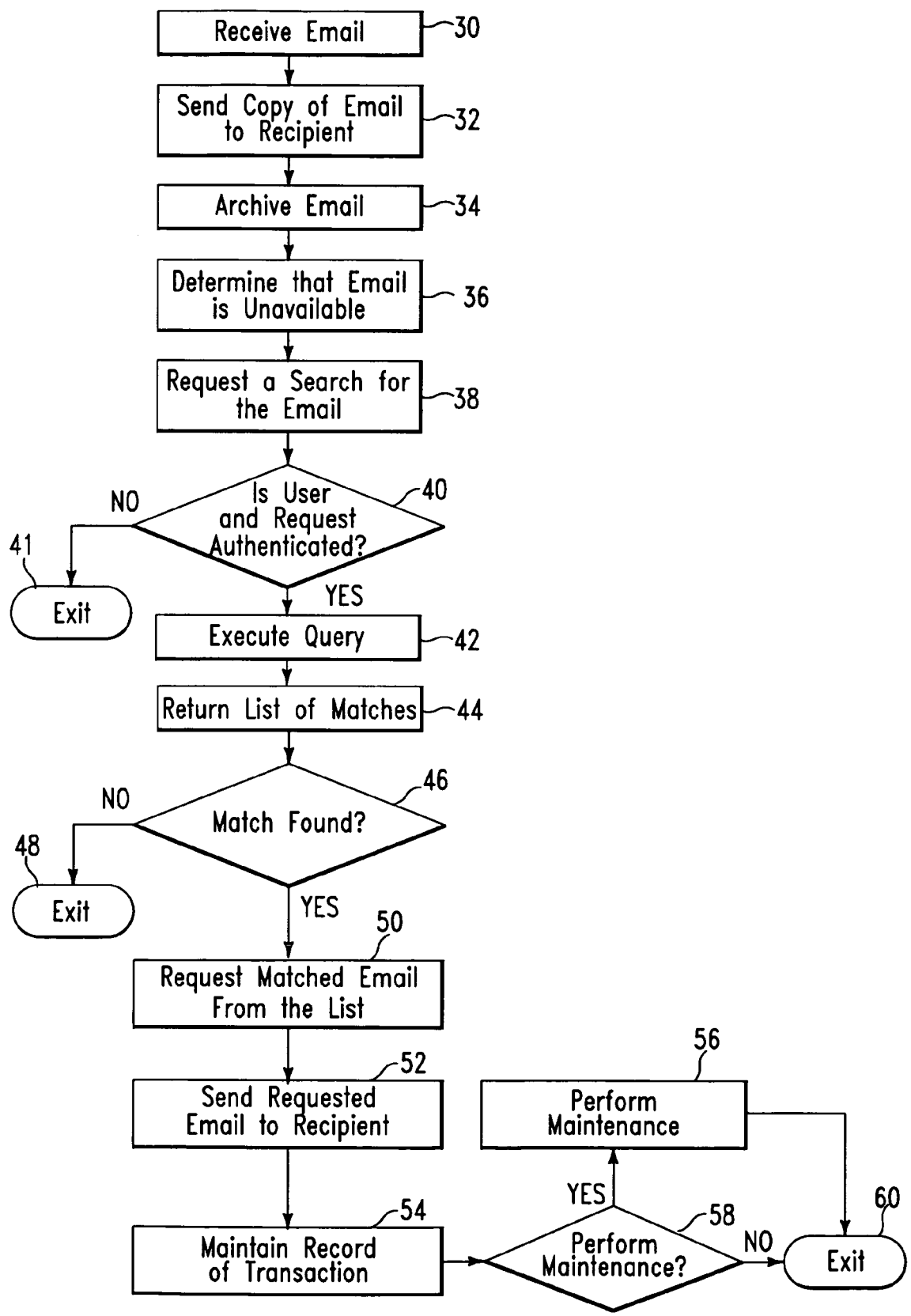
FIG. 2 is a flowchart illustrating an algorithm detailing an overall process used by the system of FIG. 1, in accordance with embodiments of the present invention

FIG. 2 is a flowchart illustrating an algorithm detailing an overall process used by system 2 for recovering emails that have been made unavailable, in accordance with embodiments of the present invention. In step 30, an email arrives at inbound email server 14 from a sender (i.e., using terminals 8e or 8f). In step 32, inbound email server 14 sends a first copy of the email to recipient email 22 inbox (recipient email 22 inbox may be on terminals 8a . . . 8d or on server system 25). In step 34, inbound email server 14 sends the email to archive server 18, which indexes the email for later searching process. Additionally, inbound email server 14 stores the email in email archive database 20 for a later retrieval. In step 36, the email recipient searches for the email and determines that the email is unavailable (e.g., the email has been accidentally deleted). In step 38, the email recipient uses a search facility located on or presented to terminals 8a . . . 8d using data located in server system 25 to submit a request for a search of the email (i.e., an email re-send search request). In step 40, the search request is sent to archive server 18, via inbound server 14, using any protocol that supports authentication (e.g., POP3, SMTP, IMAP, a non-email protocol such as HTTP, etc). If in step 40, the recipient and request is not authenticated, then in step 41 the process terminates. If in step 40, the recipient and request is authenticated (i.e., the email recipient is entitled to participate in the re-send process), then in step 42 archive server 18 executes a query in accordance with the email recipient request. In step 44, archive server 18 returns a list of potential matches, which are displayed at the recipient's search facility screen (i.e., any of terminals 8a . . . 8d). In step 46, the email recipient determines if a match is found. If in step 46, the email recipient selects an email or emails among the matches on the list, then in step 50 a request for the selected email is sent to archive server 18 via inbound server 14. If in step 46, the email recipient does not select an email or emails (i.e., a match is not found) the process terminates in step 48. In step 52, archive server 18 sends the requested email (i.e., a second copy of the email) or emails to recipient email inbox 22. In step 54 archive server 18 maintains a record of the transaction. Archive server 18 optionally records the transaction in a database table for billing, reporting, or quota purposes. As a result of step 52, the email recipient receives the second copy of the email at recipient email inbox 22 as if it were the original email, including an original date and time that the email was originally sent. In step 58, it is determined if a maintenance process should be performed on email archive database 20. If in step 58, archive server 18, the email recipient, or an administrator, does not request a maintenance operation on email archive database 20, then in step 60 the process terminates. If in step 58, archive server 18, the email recipient, or an administrator, requests a maintenance operation on email archive database 20, then in step 58 a maintenance operation is performed. If the requested maintenance operation is to purge archived email, portions of archived email, or email file attachments, such as for releasing space, according to the maintenance request criteria, then index information for the emails to be purged is removed or updated and the emails, portions of emails, or email file attachments are deleted from email archive database 20. If the requested maintenance operation is to prevent email retrieval, such as due to service levels or exceeded quota, then index is updated with a flag to prevent email retrieval. If the requested maintenance operation is to manage permissions, then permissions are applied to a users table or index.

Figure 3:
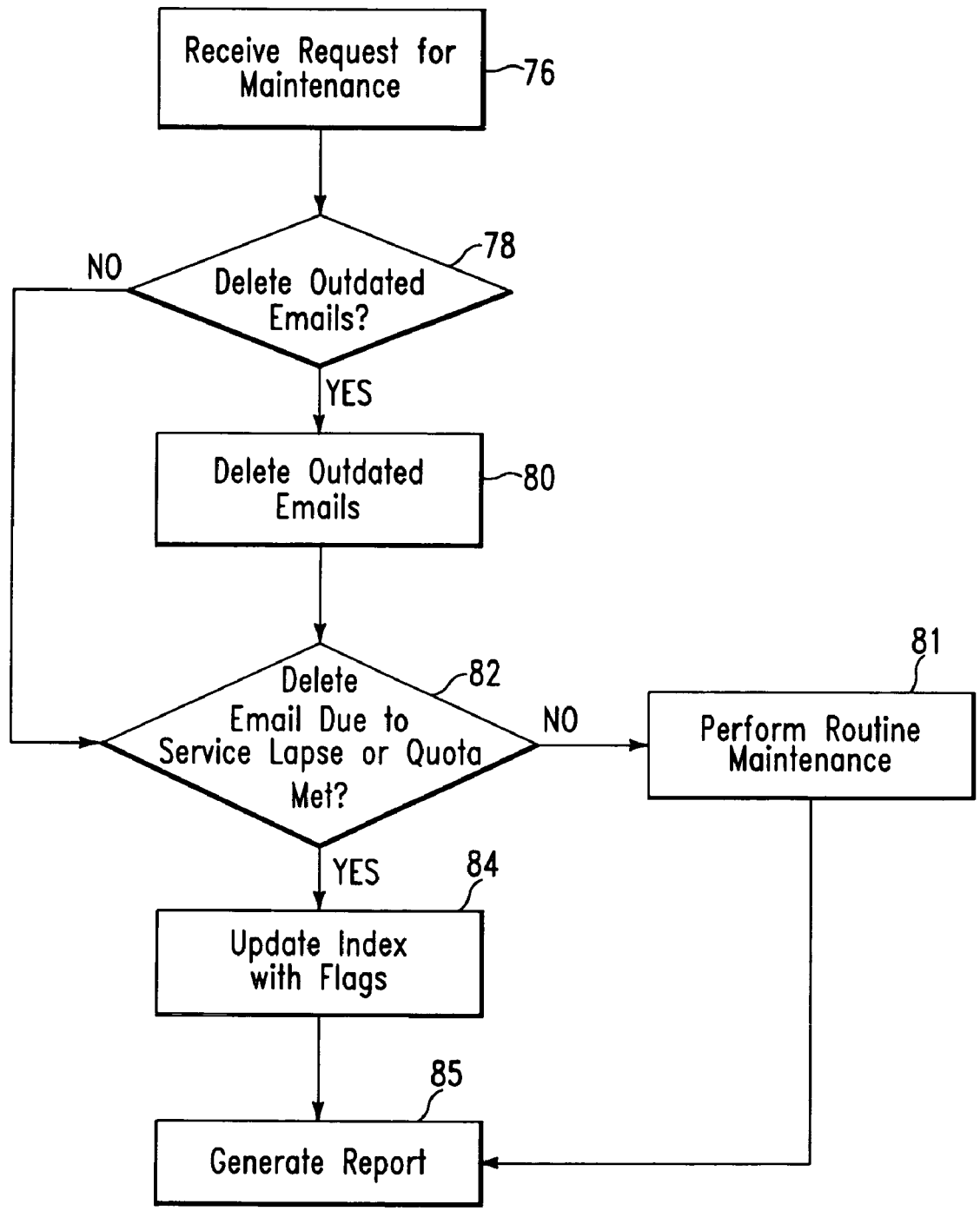
FIG. 3 is a flowchart illustrating an algorithm detailing an authentication step of FIG. 2, in accordance with embodiments of the present invention.

FIG. 3 is a flowchart illustrating an algorithm detailing step 56 of FIG. 2, in accordance with embodiments of the present invention. In step 76, archive server 18, email recipient, an administrator, requests a maintenance operation on email archive database 20 and the requestor is authenticated. If in step 78, the request is to purge archived email, such as for releasing space, according to maintenance request criteria, then in step 80, index information for the emails to be purged is removed and the emails are deleted from email archive database 20. If in step 78, the request is not to purge archived email, then the process jumps to step 82. If in step 78, the request is to prevent email retrieval due to service levels or exceeded quota, then in step 84 the index is updated with a flag to prevent email retrieval and a report is generated in step 85. If in step 78, the request is not to prevent email retrieval due to service levels or exceeded quota then in step 81 routine maintenance is performed and a report is generated in step 85.

Figure 4:
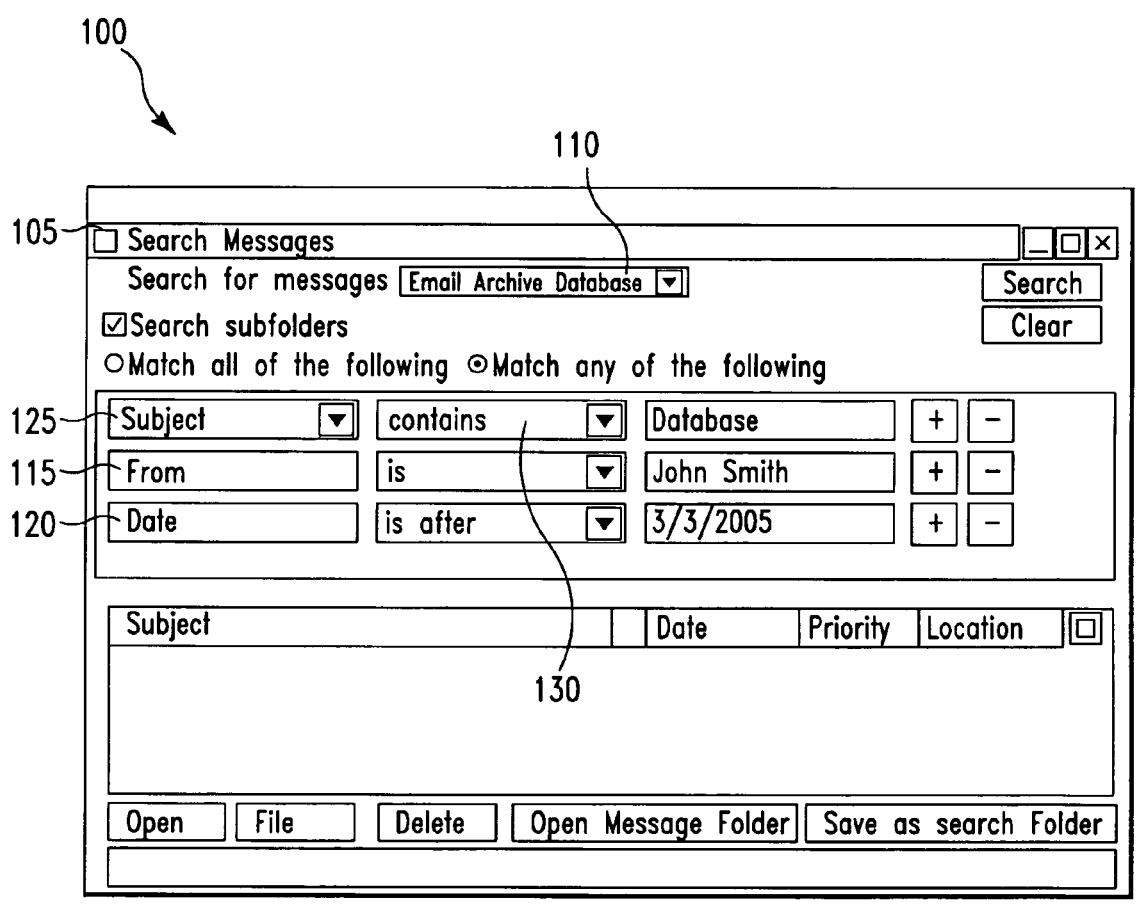
FIG. 4 illustrates an example of a re-send dialog box as described in FIG. 1, in accordance with embodiments of the present invention.

FIG. 4 illustrates an example of a re-send dialog box 100 as described in FIG. 1, in accordance with embodiments of the present invention. Re-send dialog box 100 provides an interface to sever system 25 (e.g., archive server 18) for email recipient. Re-send dialog box 100 is generated using a software tool located on or presented to terminals 8a . . . 8d using data located in server system 25. Re-send dialog box 100 is accessible to the email recipient using any of terminals 8a . . . 8d. In this example a search messages block 105 comprising a pull down menu 110 entitled email archive database has been generated by server system 25. Re-send dialog box 100 illustrates that the email recipient wants to search archive database 20 to request a second copy of an email(s) where a subject field comprised the term "Database", where the sender (i.e., from field 115) was "John Smith", and where date field 120 was anytime after Mar. 3, 2005. Re-send dialog box 100 additionally comprises a subject field 125 and contains field 130 as described with reference to FIG. 5.

Figure 5:
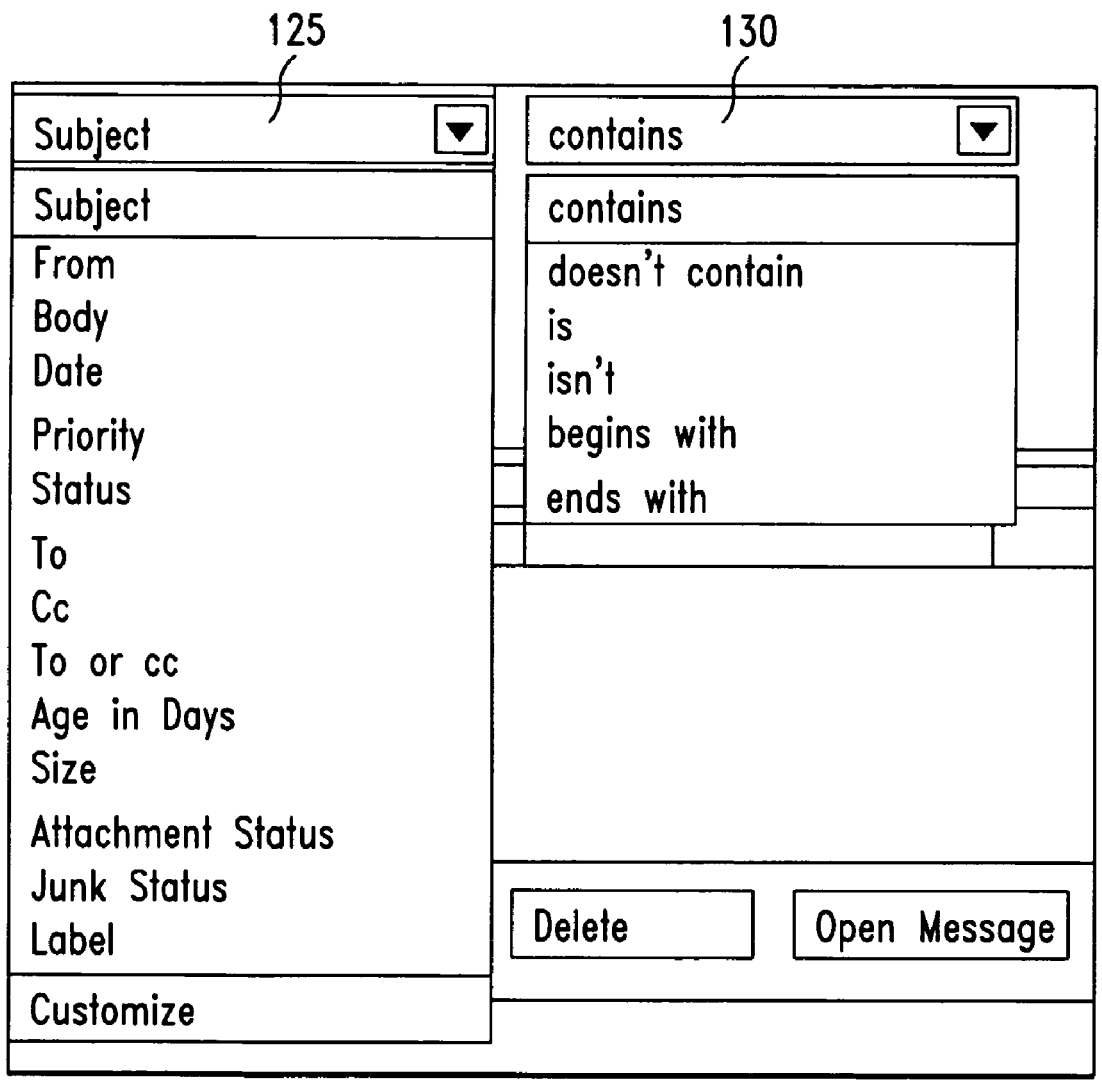
FIG. 5 illustrates a subject field and contain field of FIG. 4, in accordance with embodiments of the present invention.

FIG. 5 illustrates a subject field 125 and contain field 130 of FIG. 4, in accordance with embodiments of the present invention.

Figure 6:
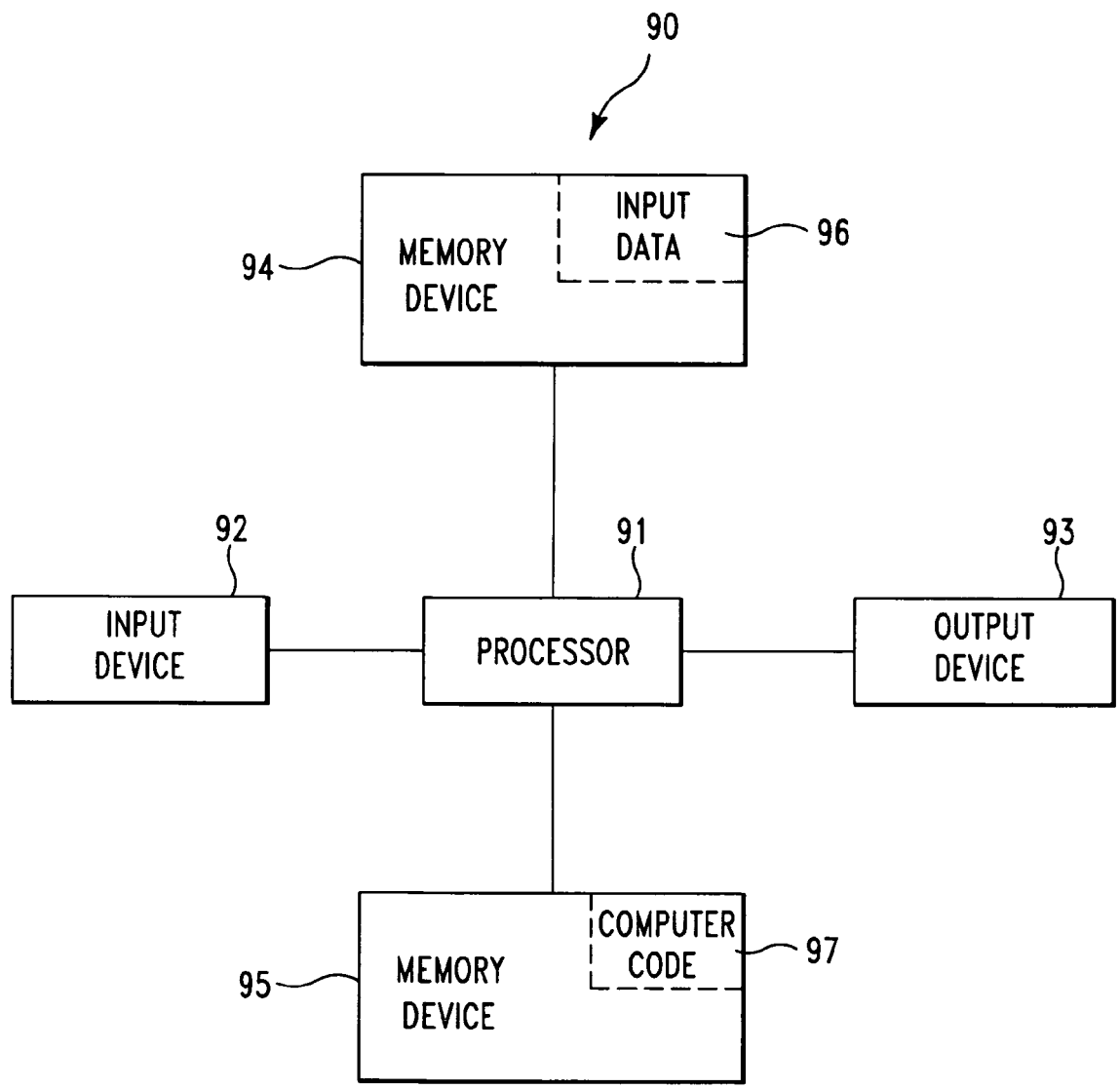
FIG. 6 illustrates a computer system used for recovering emails that have been made unavailable, in accordance with embodiments of the present invention.

FIG. 6 illustrates a computer system 90 used for recovering emails that have been made unavailable, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., monitor 110), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for recovering emails that have been made unavailable. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithms of FIGS. 2 and 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to synchronize and display text associated with an audio/video performance. Thus the present invention discloses a process for deploying or integrating computing infrastructure, comprising integrating computer-readable code into the computer system 90, wherein the code in combination with the computer system 90 is capable of performing a method for recovering emails that have been made unavailable. In another embodiment, the invention provides a business method that performs the process steps of the invention on a subscription, advertising, and/or fee basis. That is, a service provider, such as a Solution Integrator, could offer to recover emails that have been made unavailable. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, comprising:
    receiving, by a server system, an email from a sender, said email comprising a message for a recipient;
    archiving, by said server system, said email with a plurality of emails saved on said server system;
    sending, by said server system, a first copy of said email to said recipient;
    sending, by said server system to said recipient, a keyword comprising an argument to determine that said server system comprises email re-send functionality;
    enabling, by said server system in response to a recipient response from said recipient, said email re-send functionality, wherein said recipient response from said recipient is associated with said argument;
    receiving, by said server system from said recipient, an indication that said first copy is unavailable to said recipient;
    generating, by a computer processor of said server system in response to said indication that said first copy is unavailable to said recipient, a command interface for accepting a user defined input criteria for locating said email, wherein said command interface comprises a subject field and a contains field for performing a search for said email by searching through said plurality of emails using search criteria located in said subject field and said contains field, wherein said subject field comprises first search criteria comprising an email subject identifier field associated with a priority of said email, a status of said email, an age in days of said email, and a junk status of said email, and wherein said contains field comprises second search criteria comprising an email contains field, an email doesn't contain field, an email begins with field, and an email ends with field;
    presenting, by said server system to said recipient, said command interface;
    receiving, by said server system from said recipient via said command interface, first user defined input criteria associated with said email and selected from said subject field and said contains field;
    receiving, by said server system, a request from said recipient to query said plurality of emails in order to search for said email;
    authenticating, by said server system, said request and said recipient;
    querying, by said server system based on said first user defined criteria, said plurality of emails;
    locating, as a result of said querying, said email;
    sending, by said server system, a second copy of said email to said recipient;
    generating, by said server system, a record indicating a transaction associated with said sending said second copy of said email to said recipient;
    recording, by said server system, said transaction in a database table for billing, reporting, and quota purposes;
    indicating, by said server system, that a group of emails of said plurality of emails have exceeded a specified quota;
    generating, by said server system, an index comprising said group of emails;
    associating, by said server system, a first prevent email retrieval flag with said index comprising said group of emails;
    receiving, by said server system, a command for performing a maintenance process of said server system;
    first determining, by said server system in response to said command, that a file size of said plurality of emails has exceeded a specified threshold associated with memory space within a memory system comprised by said server system;
    removing, by said server system in response to said first determining, at least one email of said plurality of emails from said server system;
    second determining, by said server system in response to said command, that said recipient has exceeded a quota of retrieved emails;
    third determining, by said server system, that said recipient has not exceeded a specified service level;
    disabling, by said server system in response to said second determining and said third determining, said recipient from receiving any additional email of said plurality of emails from said server system;
    fourth determining, by said server system, that said plurality of emails has been scanned by an outdated spam and virus detection routine;
    scanning, by said server system in response to results of said fourth determining, said plurality of emails with an updated spam and virus detection routine;
    generating, by said server system, an index comprising said plurality of emails;
    associating, by said server system, a second prevent email retrieval flag with said index comprising said plurality of emails; and
    generating, by said server system, a report indicating results of said first determining, said second determining, said third determining, and said fourth determining.

2. The method of claim 1, wherein said archiving comprises saving said email on said server system and indexing said email with respect to said plurality of emails.

3. The method of claim 1, wherein said server system comprises an archival server apparatus and an email receiving apparatus.

4. The method of claim 1, wherein said querying comprises performing a search for said email by searching through said plurality of emails using a specified search criteria.

5. The method of claim 4, wherein said specified search criteria comprises at least a portion of an email message identifier selected from the group consisting of a sender's name, a sender's email address, an email subject, an expression within an email body, an email header, an email priority, an email To list, an email Cc list, a date, an email size, and an attachment status.

6. The method of claim 4, further comprising:
generating, by said server system using said specified search criteria, a list identifying a group of emails from said plurality of emails; and
sending, said list to said recipient.

7. The method of claim 6, further comprising:
presenting, by said server system, said list to said recipient using an interface that will enable said recipient to select specified emails identified on said list.

8. The method of claim 1, further comprising:
deleting, from said server system, a group of emails from said plurality of emails that comprise an identifier exceeding a specified threshold.

9. The method of claim 8, wherein said specified threshold comprises a threshold selected from the group consisting of a specified date and a level of importance of said recipient with respect to other email recipients.

10. The method of claim 1, further comprising:
generating, by said server system, a report indicating that said second copy was sent to said recipient; and
sending, by said server system, said report to said sender.

11. A server system comprising a computer processor coupled to a computer-readable memory, said memory comprising instructions that when executed by the computer processor implement an email recovery method, said method comprising:
receiving, by a server system including a plurality of servers, an email from a sender, said email comprising a message for a recipient;
archiving, by said server system, said email with a plurality of emails saved on said server system;
sending, by said server system, a first copy of said email to said recipient;
sending, by said server system to said recipient, a keyword comprising an argument to determine that said server system comprises email re-send functionality;
enabling, by said server system in response to a recipient response from said recipient, said email re-send functionality, wherein said recipient response from said recipient is associated with said argument;
receiving, by said server system from said recipient, an indication that said first copy is unavailable to said recipient;
generating, by a computer processor of said server system in response to said indication that said first copy is unavailable to said recipient, a command interface for accepting a user defined input criteria for locating said email, wherein said command interface comprises a subject field and a contains field for performing a search for said email by searching through said plurality of emails using search criteria located in said subject field and said contains field, wherein said subject field comprises first search criteria comprising an email subject identifier field associated with a priority of said email, a status of said email, an age in days of said email, and a junk status of said email, and wherein said contains field comprises second search criteria comprising an email contains field, an email doesn't contain field, an email begins with field, and an email ends with field;
presenting, by said server system to said recipient, said command interface;
receiving, by said server system from said recipient via said command interface, first user defined input criteria associated with said email and selected from said subject field and said contains field;
receiving, by said server system, a request from said recipient to query said plurality of emails in order to search for said email;
authenticating, by said server system, said request and said recipient;
querying, by said server system based on said first user defined criteria, said plurality of emails;
locating, as a result of said querying, said email;
sending, by said server system, a second copy of said email to said recipient;
generating, by said server system, a record indicating a transaction associated with said sending said second copy of said email to said recipient;
recording, by said server system, said transaction in a database table for billing, reporting, and quota purposes;
indicating, by said server system, that a group of emails of said plurality of emails have exceeded a specified quota;
generating, by said server system, an index comprising said group of emails;
associating, by said server system, a first prevent email retrieval flag with said index comprising said group of emails;
receiving, by said server system, a command for performing a maintenance process of said server system;
first determining, by said server system in response to said command, that a file size of said plurality of emails has exceeded a specified threshold associated with memory space within a memory system comprised by said server system;
removing, by said server system in response to said first determining, at least one email of said plurality of emails from said server system;
second determining, by said server system in response to said command, that said recipient has exceeded a quota of retrieved emails;
third determining, by said server system, that said recipient has not exceeded a specified service level;
disabling, by said server system in response to said second determining and said third determining, said recipient from receiving any additional email of said plurality of emails from said server system;
fourth determining, by said server system, that said plurality of emails has been scanned by an outdated spam and virus detection routine;
scanning, by said server system in response to results of said fourth determining, said plurality of emails with an updated spam and virus detection routine;
generating, by said server system, an index comprising said plurality of emails; associating, by said server system, a second prevent email retrieval flag with said index comprising said plurality of emails; and
generating, by said server system, a report indicating results of said first determining, said second determining, said third determining, and said fourth determining.

12. The server system of claim 11, wherein said archiving comprises saving said email on said server system and indexing said email with respect to said plurality of emails.

13. The server system of claim 11, further comprising an archival server apparatus and an email receiving apparatus.

14. The server system of claim 11, wherein said querying comprises performing a search for said email by searching through said plurality of emails using a specified search criteria.

15. The server system of claim 14, wherein said specified search criteria comprises at least a portion of an email message identifier selected from the group consisting of a sender's name, a sender's email address, an email subject, an expression within an email body, an email header, an email priority, an email To list, an email Cc list, a date, an email size, and an attachment status.

16. The server system of claim 14, wherein said method further comprises:
generating, by said server system using said specified search criteria, a list identifying a group of emails from said plurality of emails; and
sending, said list to said recipient.

17. The server system of claim 16, wherein said method further comprises:
presenting, by said server system, said list to said recipient using an interface that will enable said recipient to select specified emails from said list.

18. The server system of claim 11, wherein said method further comprises:
deleting, from said server system, a group of emails from said plurality of emails that comprise an identifier exceeding a specified threshold.

19. The server system of claim 18, wherein said specified threshold comprises a threshold selected from the group consisting of a specified date and a level of importance of said recipient with respect to other email recipients.

20. The server system of claim 11, wherein said method further comprises:
generating, by said server system, a report indicating that said second copy was sent to said recipient; and
sending, by said server system, said report to said sender.

21. A computer program product, including a computer readable storage device storing a computer readable program code, said computer readable program code comprising an algorithm that when executed by a computer processor implements an email recovery method within a server system, said method comprising;
receiving, by a server system, an email from a sender, said email comprising a message for a recipient;
archiving, by said server system, said email with a plurality of emails saved on said server system;
sending, by said server system, a first copy of said email to said recipient;
sending, by said server system to said recipient, a keyword comprising an argument to determine that said server system comprises email re-send functionality;
enabling, by said server system in response to a recipient response from said recipient, said email re-send functionality, wherein said recipient response from said recipient is associated with said argument;
receiving, by said server system from said recipient, an indication that said first copy is unavailable to said recipient;
generating, by a computer processor of said server system in response to said indication that said first copy is unavailable to said recipient, a command interface for accepting a user defined input criteria for locating said email, wherein said command interface comprises a subject field and a contains field for performing a search for said email by searching through said plurality of emails using search criteria located in said subject field and said contains field, wherein said subject field comprises first search criteria comprising an email subject identifier field associated with a priority of said email, a status of said email, an age in days of said email, and a junk status of said email, and wherein said contains field comprises second search criteria comprising an email contains field, an email doesn't contain field, an email begins with field, and an email ends with field;
presenting, by said server system to said recipient, said command interface;
receiving, by said server system from said recipient via said command interface; first user defined input criteria associated with said email and selected from said subject field and said contains field;
receiving, by said server system, a request from said recipient to query said plurality of emails in order to search for said email;
authenticating, by said server system, said request and said recipient;
querying, by said server system based on said first user defined criteria, said plurality of emails;
locating, as a result of said querying, said email;
sending, by said server system, a second copy of said email to said recipient;
generating, by said server system, a record indicating a transaction associated with said sending said second copy of said email to said recipient;
recording, by said server system, said transaction in a database table for billing, reporting, and quota purposes;
indicating, by said server system, that a group of emails of said plurality of emails have exceeded a specified quota;
generating, by said server system, an index comprising said group of emails;
associating, by said server system, a first prevent email retrieval flag with said index comprising said group of emails;
receiving, by said server system, a command for performing a maintenance process of said server system;
first determining, by said server system in response to said command, that a file size of said plurality of emails has exceeded a specified threshold associated with memory space within a memory system comprised by said server system;
removing, by said server system in response to said first determining, at least one email of said plurality of emails from said server system;
second determining, by said server system in response to said command, that said recipient has exceeded a quota of retrieved emails;
third determining, by said server system, that said recipient has not exceeded a specified service level;
disabling, by said server system in response to said second determining and said third determining, said recipient from receiving any additional email of said plurality of emails from said server system;
fourth determining, by said server system, that said plurality of emails has been scanned by an outdated spam and virus detection routine;
scanning, by said server system in response to results of said fourth determining, said plurality of emails with an updated spam and virus detection routine;
generating, by said server system, an index comprising said plurality of emails; associating, by said server system, a second prevent email retrieval flag with said index comprising said plurality of emails; and generating, by said server system, a report indicating results of said first determining, said second determining, said third determining, and said fourth determining.

22. The computer program product of claim 21, wherein said archiving comprises saving said email on said server system and indexing said email with respect to said plurality of emails.

23. The computer program product of claim 21, wherein said querying comprises performing a search for said email by searching through said plurality of emails using a specified search criteria.

24. The computer program product of claim 23, wherein said specified search criteria comprises at least a portion of an email message identifier selected from the group consisting of a sender's name, a sender's email address, an email subject, an expression within an email body, an email header, an email priority, an email To list, an email Cc list, a date, an email size, and an attachment status.

25. The computer program product of claim 23, wherein said method further comprises:

generating, by said server system using said specified search criteria, a list identifying a group of emails from said plurality of emails; and sending, said list to said recipient.

26. The computer program product of claim 25, wherein said method further comprises:

presenting, by said server system, said list to said recipient using an interface that will enable said recipient to select specified emails from said list.

27. The computer program product of claim 21, wherein said method further comprises:

deleting, from said server system, a group of emails from said plurality of emails that comprise an identifier exceeding a specified threshold.

28. The computer program product of claim 27, wherein said specified threshold comprises a threshold selected from the group consisting of a specified date and a level of importance of said recipient with respect to other email recipients.

29. The computer program product of claim 21, wherein said method further comprises:

generating, by said server system, a report indicating that said second copy was sent to said recipient; and sending, by said server system, said report to said sender.

30. A process for integrating computing infrastructure, comprising integrating computer-readable code into a server system, wherein the code in combination with the server system is capable of performing an email recovery method comprising:

receiving, by said server system, an email from a sender, said email comprising a message for a recipient;

archiving, by said server system, said email with a plurality of emails saved on said server system;

sending, by said server system, a first copy of said email to said recipient;

sending, by said server system to said recipient, a keyword comprising an argument to determine that said server system comprises email re-send functionality;

enabling, by said server system in response to a recipient response from said recipient, said email re-send functionality, wherein said recipient response from said recipient is associated with said argument;

receiving, by said server system from said recipient, an indication that said first copy is unavailable to said recipient;

generating, by a computer processor of said server system in response to said indication that said first copy is unavailable to said recipient, a command interface for accepting a user defined input criteria for locating said email, wherein said command interface comprises a subject field and a contains field for performing a search for said email by searching through said plurality of emails using search criteria located in said subject field and said contains field, wherein said subject field comprises first search criteria comprising an email subject identifier field associated with a priority of said email, a status of said email, an age in days of said email, and a junk status of said email, and wherein said contains field comprises second search criteria comprising an email contains field, an email doesn't contain field, an email begins with field, and an email ends with field;

presenting, by said server system to said recipient, said command interface;

receiving, by said server system from said recipient via said command interface, first user defined input criteria associated with said email and selected from said subject field and said contains field;

receiving, by said server system, a request from said recipient to query said plurality of emails in order to search for said email;

authenticating, by said server system, said request and said recipient;

querying, by said server system based on said first user defined criteria, said plurality of emails;

locating, as a result of said querying, said email;

sending, by said server system, a second copy of said email to said recipient;

generating, by said server system, a record indicating a transaction associated with said sending said second copy of said email to said recipient;

recording, by said server system, said transaction in a database table for billing, reporting, and quota purposes;

indicating, by said server system, that a group of emails of said plurality of emails have exceeded a specified quota;

generating, by said server system, an index comprising said group of emails;

associating, by said server system, a first prevent email retrieval flag with said index comprising said group of emails;

receiving, by said server system, a command for performing a maintenance process of said server system;

first determining, by said server system in response to said command, that a file size of said plurality of emails has exceeded a specified threshold associated with memory space within a memory system comprised by said server system;

removing, by said server system in response to said first determining, at least one email of said plurality of emails from said server system;

second determining, by said server system in response to said command, that said recipient has exceeded a quota of retrieved emails;

third determining, by said server system, that said recipient has not exceeded a specified service level;

disabling, by said server system in response to said second determining and said third determining, said recipient from receiving any additional email of said plurality of emails from said server system;

fourth determining, by said server system, that said plurality of emails has been scanned by an outdated spam and virus detection routine;

scanning, by said server system in response to results of said fourth determining, said plurality of emails with an updated spam and virus detection routine;

generating, by said server system, an index comprising said plurality of emails;

associating, by said server system, a second prevent email retrieval flag with said index comprising said plurality of emails; and generating, by said server system, a report indicating results of said first determining, said second determining, said third determining, and said fourth determining.

31. The process of claim 30, wherein said method further comprises:

generating, by said server system, a report indicating that said second copy was sent to said recipient; and sending, by said server system, said report to said sender.

32. The method of claim 1, further comprising:

enabling, by said server system in response to said indication that said first copy is unavailable, resend functionality to perform said generating said command interface.

33. The method of claim 1, wherein said indication indicates that said first copy of said email was never received by said recipient.

* * * * *